No. 798,211. PATENTED AUG. 29, 1905.
C. W. PUTNAM.
THERMOMETER.
APPLICATION FILED OCT. 10, 1904.

Attest;
E. W. Waite
W. L. Goodrich

Inventor,
Charles W. Putnam;
By A. B. Upham,
His Attorney.

UNITED STATES PATENT OFFICE.

CHARLES W. PUTNAM, OF AMESBURY, MASSACHUSETTS.

THERMOMETER.

No. 798,211.  Specification of Letters Patent.  Patented Aug. 29, 1905.

Application filed October 10, 1904. Serial No. 227,782.

*To all whom it may concern:*

Be it known that I, CHARLES W. PUTNAM, a citizen of the United States, and a resident of Amesbury, in the county of Essex, State of Massachusetts, have invented certain new and useful Improvements in Thermometers, of which the following is a full, clear, and exact description.

This invention is in that line of thermometers wherein a hand or pointer is moved over the face of a dial by means of the unequal expansion of two metallic strips; and my invention has for its object the effecting of improvements whereby there shall be no backlash or lost motion on the part of the pointer, no frictional resistance between the various winds of the metallic strips or lamina, and no disarrangement of the last-named member during transportation.

My invention also pertains to certain improvements in details of construction, all as hereinafter set forth.

Figure 1:
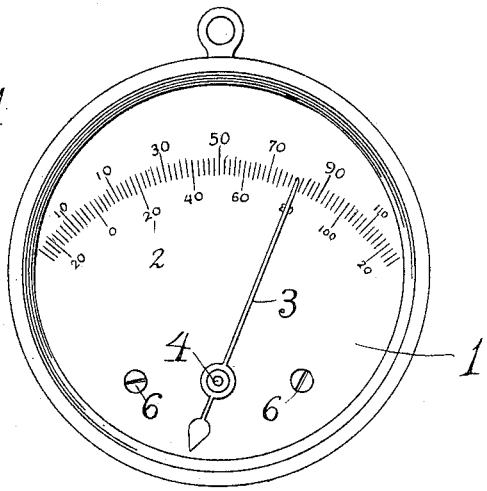
Figure 2:
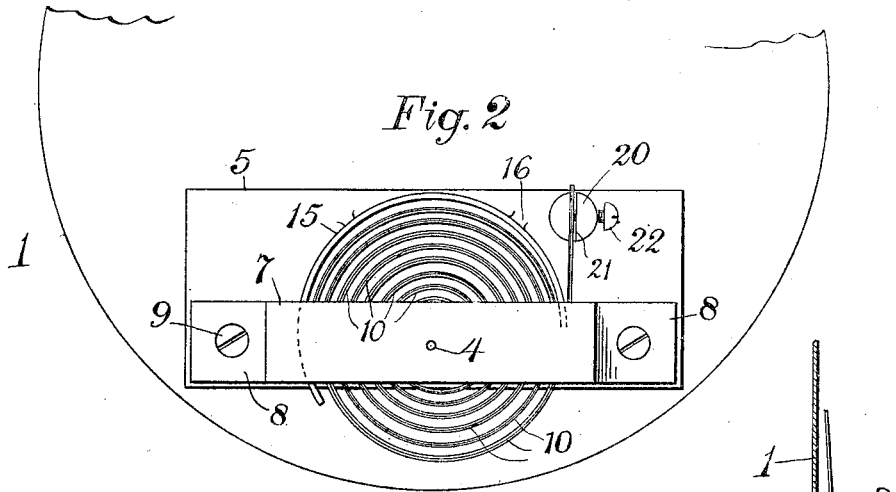
Figure 3:
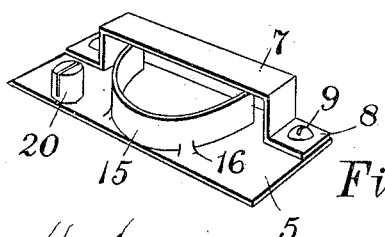
Figure 4:
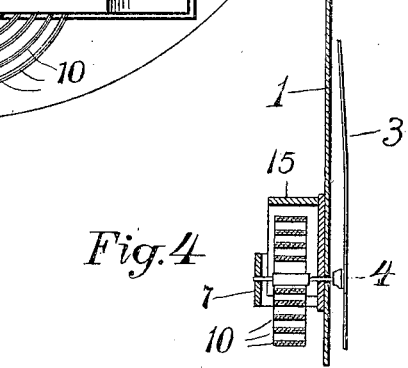

Referring to the drawings forming part of this specification, Figure 1 is a face view of a thermometer embodying my improvements. Fig. 2 is a rear view, on an enlarged scale, of the lower part of the dial, showing the main features of my invention connected therewith. Fig. 3 is a perspective view showing the bridge, guard, and certain other features of my improvements. Fig. 4 is a vertical transverse section of the lower part of the dial and parts connected therewith.

The dial 1 is secured in a suitable case, as shown in Fig. 1, and has imprinted thereon certain marks and numerals to designate the various degrees of temperature indicated by the hand or pointer 3. The staff 4, to which this pointer is rigidly secured, is preferably mounted near the lower part of the dial, for the reason hereinafter set forth, said staff loosely penetrating the dial and having its bearings in the plate 5 and the bridge 7, fastened to said plate by screws 9. This bridge is formed from a strip of metal bent into the shape shown in Fig. 3, with said screws 9 penetrating its feet 8. Said plate is fastened to the rear of the dial 1 by screws 6. (Shown in Fig. 1.) Fastened directly to said staff 4 is one end of the coiled lamina 10, which is composed in the usual manner of two differently-expanding metals, the other end of the same being held in the split post 20 by the set-screw 22. Ordinarily this lamina is coiled without regard to the relative positions of its various winds; but I have discovered that when so wound that the various coils contact with each other wholly or in part there is a frictional resistance between such contacting parts, which materially interferes with the reliability of the thermometer. The result is that small changes in temperature fail to be recorded by a corresponding alteration in the pointer's position and that not until the temperature has changed to a substantial extent will the pointer give notice of the fact, and then only when a sudden jar causes the frictionally-bound coils to be released and the pointer to jump to its proper point, where it remains until another jump indicates another change in temperature. To remove this difficulty, I wind the laminated coil in such a manner that there is a substantial space between all the turns thereof, and hence no possibility of contact and consequent frictional resistance. This is shown in Fig. 2. By thus preventing friction between the various coils of the lamina I am enabled to materially increase without trouble the number of such coils and consequently the length of the lamina and its total of differential expansion. This therefore permits of the end of the lamina being secured directly to the staff 4 instead of through multiplying-gearing, as in the usual manner, and still provides sufficient oscillation for the pointer to compass all ordinary variations in temperature. When the dial is comparatively small, I prefer to locate the staff 4 near its lower periphery and have the dial-markings 2 concentric therewith and nearer the top of the dial. This gives a longer pointer and larger degree-markings. By thus connecting the lamina direct to the pointer-staff there can be none of the backlash or loss of motion consequent upon the employment of the rack and pinion customarily used. Further, the expense and liability to wear and breakage are also materially reduced by this construction.

In addition to the function of terminal support for the staff of the pointer performed by the bridge 7 is the one of aiding in holding the lamina against the possibility of dislodgment during the jars and throws incident to transportation, either in being conveyed to the place of disposal or in being carried by the purchaser in his trunk or traveling-bag. As shown in Fig. 4, although this bridge does not actually touch the lamina it is near enough thereto to keep any of the coils from being shaken out from between the others and the thermometer thereby rendered useless. To further aid in this security, I provide the arch 15, fixed to the plate 5 approximately concentric with the staff, or nearly so, but extending through an arc of about one hundred and eighty degrees. This arch is not intended to actually contact with the lamina, except at the end where the lamina end goes to the post 20. This arch being at the same side of the bridge as is the post 20 serves to hold the lamina from springing in such direction should any blow produce any tendency of the kind, while the arch does not need to extend beneath the lamina farther than shown, because the part of the latter fixed in the split post 20 serves to support the remainder of the lamina coils against a downward jar, the same acting in conjunction with the left-hand end of said arch.

The means for fastening the arch 15 to the plate 5 is preferably simply one or two spots of solder 16, as indicated in the drawings.

A thermometer made in the above-described manner is found to be simple and inexpensive to manufacture, positive and exact in its operations, and practically incapable of getting out of order. It may be adjusted, should need ever arise, by simply loosening the set-screw 22 and pulling the lamina end farther along in the slit 21.

What I claim as my invention, and for which I desire Letters Patent, is as follows, to wit:

1. In a dial-thermometer, the combination with a dial, a pointer and a staff supporting said pointer, of a spirally-wound lamina connected with said staff, a bridge fixed to the rear of said dial and inclosing said lamina, and an arch partially surrounding said lamina peripherally.

2. The combination of the dial, the pointer, staff, plate fixed to the rear of said dial, the bridge fixed at its ends to said plate, the arch fixed to said plate and having its extremities beneath said bridge, the split post fixed to said plate and having the set-screw, and the spirally-wound lamina fast at its inner end to said staff and at its outer end in said split post; said lamina being inclosed within said bridge and arch.

In testimony that I claim the foregoing invention I have hereunto set my hand this 6th day of October, 1904.

CHARLES W. PUTNAM.

Witnesses:
 PETER J. BEAUCHENE,
 A. W. REDDY, Jr.